United States Patent
Hanes et al.

(10) Patent No.: US 7,111,404 B2
(45) Date of Patent: Sep. 26, 2006

(54) SHIELD APPARATUS FOR POWER TRIMMER

(75) Inventors: Adam Hanes, Graham, NC (US); Kevin King, Durham, NC (US)

(73) Assignee: Honda Motor Co., Ltd., Tokyo (JP)

( * ) Notice: Subject to any disclaimer, the term of this patent is extended or adjusted under 35 U.S.C. 154(b) by 80 days.

(21) Appl. No.: 10/630,080

(22) Filed: Jul. 30, 2003

(65) Prior Publication Data

US 2005/0022392 A1    Feb. 3, 2005

(51) Int. Cl.
*B26B 7/00*    (2006.01)

(52) U.S. Cl. .......................... 30/276; 30/286

(58) Field of Classification Search ................ 30/276, 30/277.4, 390, 391, 286; 56/12.7; 83/478
See application file for complete search history.

(56) References Cited

U.S. PATENT DOCUMENTS

| | | | | |
|---|---|---|---|---|
| 2,539,619 A | * | 1/1951 | Goodall | 184/6.18 |
| 2,832,184 A | * | 4/1958 | Beuerle | 56/17.2 |
| 3,000,165 A | * | 9/1961 | Lill | 56/13.4 |
| 4,097,991 A | * | 7/1978 | Proulx | 30/276 |
| 4,286,675 A | | 9/1981 | Tuggle | |
| 4,642,976 A | | 2/1987 | Owens | |
| 4,813,140 A | * | 3/1989 | Calcinai | 30/276 |
| 5,077,898 A | | 1/1992 | Hartwig | |
| 5,414,934 A | * | 5/1995 | Schlessmann | 30/275.4 |
| 5,423,126 A | * | 6/1995 | Byrne | 30/276 |
| 5,651,418 A | | 7/1997 | Jerez | |
| 6,260,278 B1 | | 7/2001 | Faher | |
| 6,301,788 B1 | | 10/2001 | Webster | |
| 6,666,009 B1 | * | 12/2003 | Brandon | 56/12.7 |

\* cited by examiner

*Primary Examiner*—Kenneth E. Peterson
(74) *Attorney, Agent, or Firm*—Jenkins, Wilson, Taylor & Hunt, P.A.

(57) ABSTRACT

A shield apparatus for use with a powered vegetation trimmer of the type including a trimmer head assembly having an output shaft and a cutting mechanism rotatable with the output shaft. The shield apparatus is mounted coaxially about the output shaft between the cutting mechanism and a head portion of the head assembly. The shield includes first and second outer walls coaxially disposed about the axis of rotation of the output shaft. The first outer wall circumscribes at least a portion of the cutting element to define a distal annular gap. The second outer wall circumscribes at least a portion of the head portion of the head assembly to define a proximal annular gap. The shield isolates the output shaft from the area surrounding the cutting mechanism so as to prevent vegetative matter from contacting the output shaft, or at least minimize such contact.

3 Claims, 8 Drawing Sheets

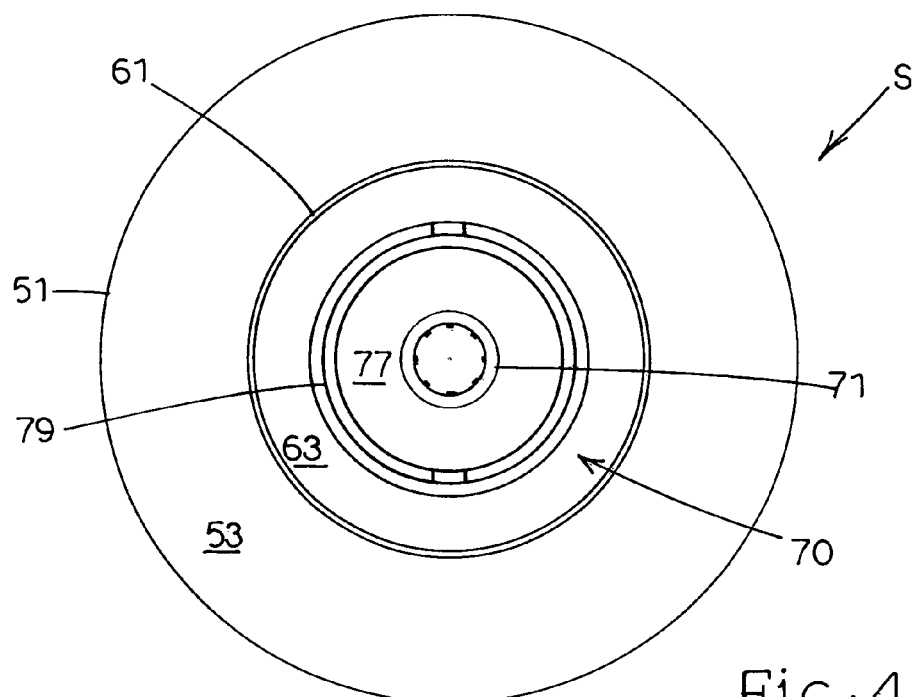
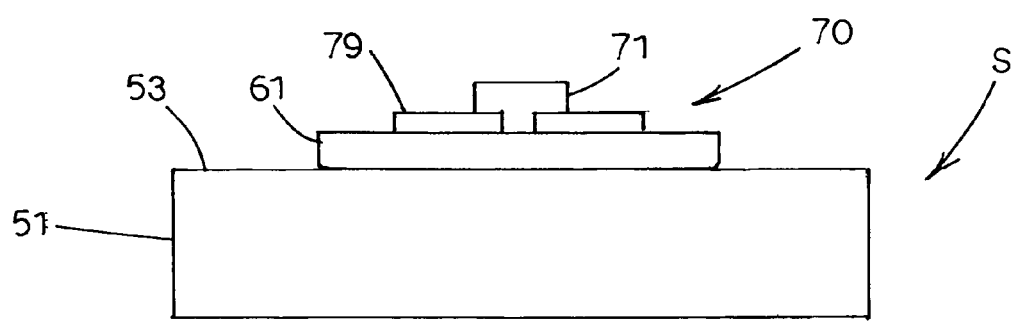
FIG·4B
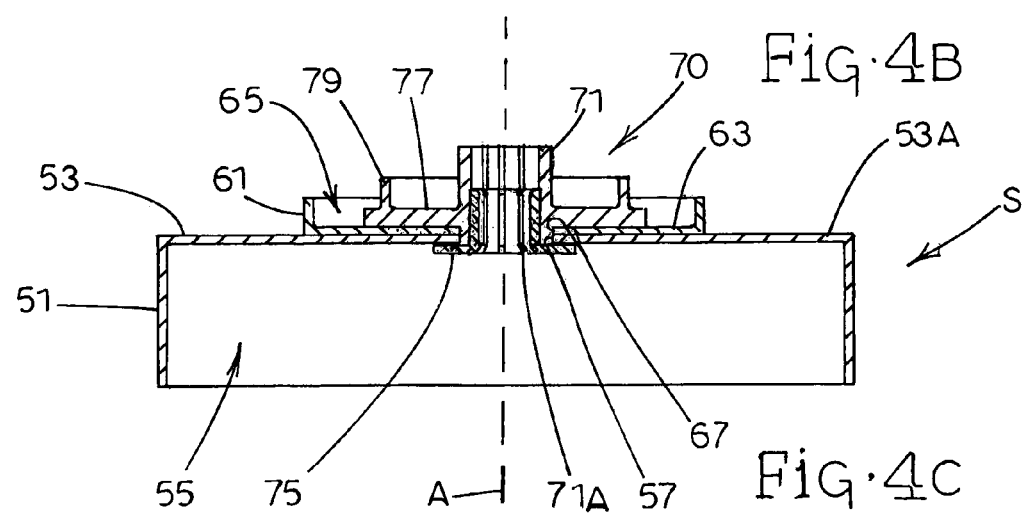
FIG·4C

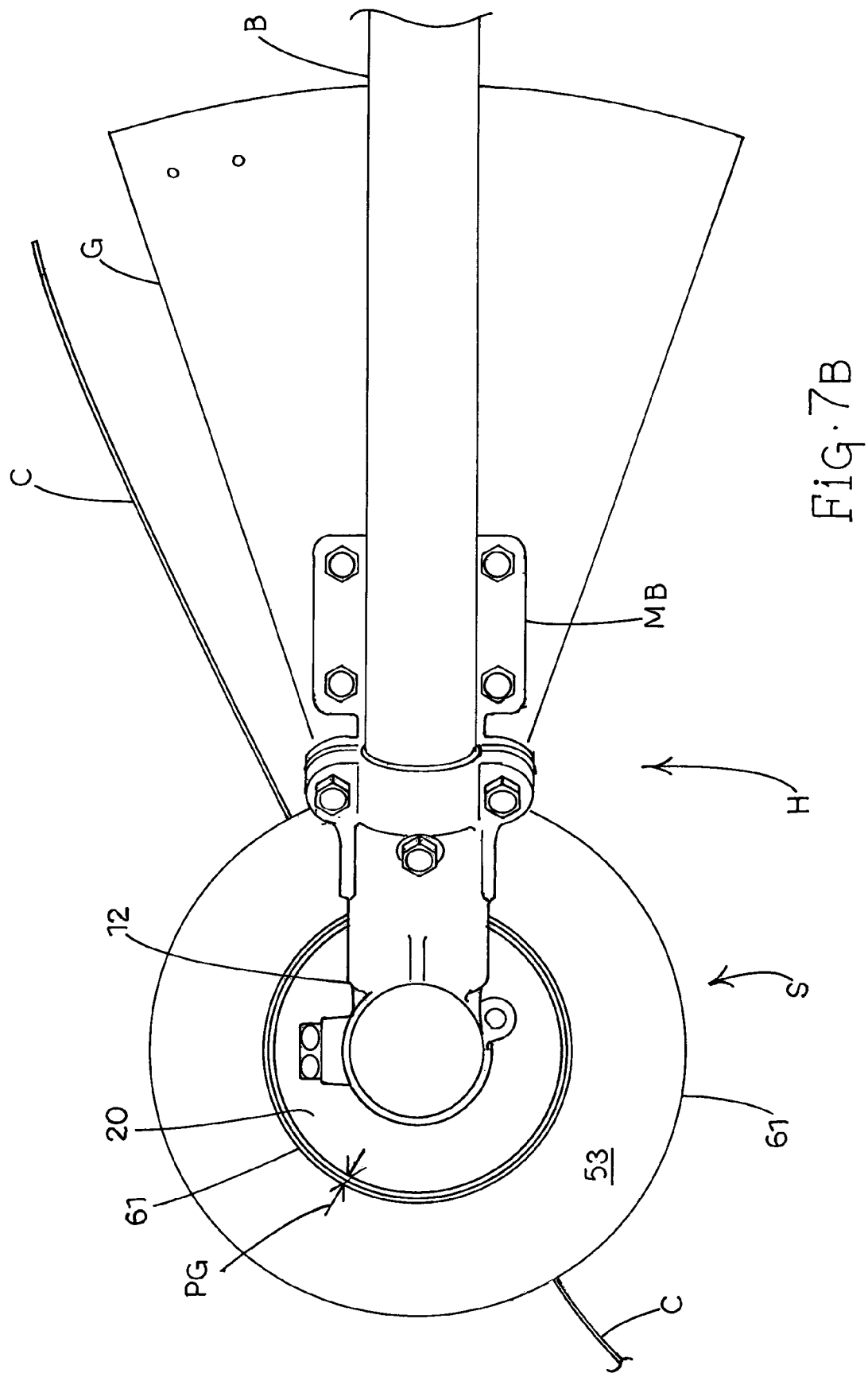

SHIELD APPARATUS FOR POWER TRIMMER

TECHNICAL FIELD

The present invention generally relates to power trimmers for cutting vegetation and the like. More particularly, the present invention relates to a shield apparatus for preventing or at least minimizing contact between vegetative matter and a rotating shaft of such trimmers.

BACKGROUND ART

Many powered trimmers of various designs have been developed and commercialized for use by an operator in cutting or trimming vegetation such as grass, weeds, and brush. In a typical configuration, an example of which is disclosed in U.S. Pat. No. 5,077,898 to Hartwig, the powered trimmer includes a motor powered by electricity or a combustive fuel such as gasoline or a gasoline/oil mixture. The motor typically provides rotational driving power to a cutting mechanism that includes one or more cutting cords of nylon or metal or a set of cutting blades. The motor and cutting mechanism are mounted to an elongate boom that is held by the operator during use of the trimmer. Typically, the trimmer is balanced by mounting the motor and cutting mechanism at opposite ends of the boom. This configuration requires that a drive shaft be disposed within the length of the boom to interconnect the rotating output component of the motor with the rotating cutting mechanism. To enable the operator to comfortably wield the trimmer in an upright standing or walking position, the cutting mechanism is often situated at an angle in relation to the motor and/or the boom. Accordingly, a angled gear case or trimmer head is commonly interposed between the boom and the cutting mechanism, with the drive shaft of the boom connected to one end of the gearing of the gear case and the cutting mechanism connected to an output shaft extending from the gear case.

During operation of a typical trimmer such as described hereinabove, as the cutting mechanism rotates, its cords or blades cut through the targeted vegetation and throw clippings outwardly. Moreover, the cutting mechanism often encounters objects such as rocks, pieces of wood, and other debris, which can also be thrown by the cutting mechanism. To protect the operator of the trimmer from injury inflicted by clippings and objects thrown by the cutting mechanism, it is common for trimmers to include a shroud or guard mounted to the gear case or boom so as to shield the operator from the thrown objects. Most clippings guards are positioned only in the frontal area between the cutting mechanism and the operator, as disclosed in aforementioned U.S. Pat. No. 5,077,898. Other clippings guards are designed to completely surround a portion of the cutting mechanism as disclosed in U.S. Pat. No. 6,260,278 to Faher, or to surround the entire cutting mechanism as disclosed in U.S. Pat. No. 6,301,788 to Webster.

It can be appreciated by persons skilled in the art that while guard structures have thus been provided to protect the operator of the trimmer from clippings and other matter cut or thrown by the cutting mechanism, trimmers have in the past failed to provide any guarding means for preventing clippings from contacting the output shaft of the gear case or trimmer head. It is well-known that clippings, and even blades of grass that have yet to be cut, have a strong tendency to wrap around the exposed portions of this output shaft as the output shaft rotates, or otherwise to become bound to or contact the output shaft. Such contact between vegetative matter and the output shaft can have a number of deleterious effects. For example, the bound vegetative matter can impede rotation of the output shaft, causing damage or premature wear of the gearing and motor provided with the trimmer. Moreover, an accumulation of vegetative matter on the output shaft can interfere with the performance of the cutting mechanism in uniformly cutting targeted areas of vegetation and effectively clearing clippings from the immediate vicinity of the cutting elements, especially in the case of nylon cords. Additionally, the binding of vegetative matter increases the frequency of maintenance required for the trimmer, such as cleaning, as well as the time required to perform maintenance.

In view of the foregoing, it would therefore be advantageous to provide a power trimmer with a shield apparatus for preventing or at least minimizing contact between vegetative matter and the output shaft of such trimmer.

SUMMARY

A shield apparatus is provided for use with a power vegetation trimmer. The shield apparatus is adapted for preventing vegetative matter from contacting a rotating output shaft of the vegetation trimmer, or at least minimizing such contact. The shield apparatus can be mounted in coaxial relation with the output shaft and can be provided as an accessory or after market component for installation to an existing trimmer. Alternatively, the shield apparatus can be provided with the trimmer as part of the initial manufacture or assembly thereof.

According to one embodiment, the shield apparatus comprises a first lateral wall, a transverse shield wall, and a second lateral wall. The first lateral wall is coaxially disposed about a central axis of the shield, and comprises a radial dimension relative to the central axis. The transverse shield wall is transversely disposed relative to the central axis and adjoins the first lateral wall. The transverse shield wall comprises an aperture coaxially disposed about the central axis to permit extension of the output shaft of the vegetation trimmer therethrough. The first lateral wall and the transverse shield wall define a first interior of the shield. The first lateral wall is adapted for enclosing at least a portion of a cutting mechanism of the vegetation trimmer. The second lateral wall is coaxially disposed about the central axis on an outer side of the transverse shield wall opposite to the first interior. The second lateral wall comprises a second radial dimension relative to the central axis that is less than the first radial dimension. The second lateral wall defines a second interior of the shield. The second lateral wall is adapted for enclosing at least a portion of a head member of the vegetation trimmer from which the output shaft extends.

According to another embodiment, the shield apparatus comprises an adapter member that is adapted for mounting to the output shaft of the vegetation trimmer for rotation therewith. The adapter member is also adapted for mounting the shield apparatus in non-contacting relation to the output shaft. The adapter member comprises a hollow cylindrical portion extending through the aperture of the transverse shield wall, a first annular adapter plate, and a second annular adapter plate. The first annular adapter plate is coaxially disposed around the cylindrical portion and disposed in the first interior. The second annular adapter plate is coaxially disposed around the cylindrical portion and disposed in the second interior.

According to yet another embodiment, a trimmer head assembly is adapted for use with a power vegetation trimmer. The trimmer head assembly comprises a head member and a shield apparatus. The head member comprises a proximal head section adapted for attachment to the vegetation trimmer, a distal head section, and a rotatable output shaft extending outwardly from the distal head section along a longitudinal axis. The output shaft is adapted for rotatably driving a cutting element that is attachable to the output shaft. The shield apparatus is adapted for preventing vegetative matter from contacting the output shaft. The shield apparatus comprises first and second outer walls coaxially disposed about the longitudinal axis. The first outer wall is adapted to circumscribe at least a portion of the cutting element by a distal annular gap. The second outer wall is adapted to circumscribe at least a portion of the distal head section of the head member by a proximal annular gap. According to one aspect, the respective widths of the distal and proximal annular gaps range from approximately 1 mm to approximately 10 mm. Preferably, the widths can range from approximately 1 mm to approximately 2 mm.

According to still another embodiment, a trimmer assembly adapted for use with a powered vegetation trimmer comprises a head member, a cutting element, and a shield apparatus. The head member comprises a proximal head section adapted for attachment to the vegetation trimmer, a distal head section, and a rotatable output shaft extending outwardly from the distal head section. The cutting element is attached to the output shaft and is rotatable therewith. The shield apparatus is disposed around the output shaft between the distal head section and the cutting element. The shield apparatus comprises a first lateral surface coaxially disposed about at least a proximal region of the cutting element nearest to the distal head section. The shield apparatus defines a distal annular gap between the first lateral surface and the cutting element. According to an aspect of this embodiment, the cutting element can comprise an annular rim that is enclosed by the first lateral surface. The annular rim and the first lateral surface define the distal annular gap. According to another aspect of this embodiment, the shield apparatus can contact the output shaft. According to a further aspect of this embodiment, the shield apparatus can comprise a transverse shield wall that adjoins the first lateral surface and has an aperture through which the output shaft extends.

According to an additional embodiment, a powered vegetation trimmer comprises an elongate member, a head member, a motor, a cutting element, and a shield apparatus. The elongate member comprises a distal end. The head member comprises a housing that is mounted to the distal end and a rotatable output shaft. The motor is mounted to the elongate member in communication with the output shaft for transmitting torque thereto, and the cutting element is attached to the output shaft and is rotatable therewith. The shield apparatus is disposed around the output shaft between the head member and the cutting element. The shield apparatus comprises a first lateral surface coaxially disposed about at least a proximal region of the cutting element. The shield apparatus defines a distal annular gap between the first lateral surface and the cutting element.

Therefore, it is an object to provide a novel shield apparatus for mounting to a powered trimmer of the type used to cut vegetative matter, and which can prevent vegetative matter from contacting the output shaft of such trimmer, or at least minimize such contact.

An object of the invention having been stated hereinabove, and which is achieved in whole or in part by the present invention, this and other objects will become evident as the description proceeds, when taken in connection with the accompanying drawings as best described hereinbelow.

BRIEF DESCRIPTION OF THE DRAWINGS

FIG. 4A is a top plan view of an embodiment of a shield apparatus provided in accordance with the present invention;

FIG. 4B is a side elevation view of the shield apparatus illustrated in FIG. 4A;

FIG. 4C is a side cross-sectional view of the shield apparatus illustrated in FIGS. 4A and 4B;

FIG. 7B is a top plan view of the trimmer head assembly illustrated in FIGS. 5 and 6.

DETAILED DESCRIPTION OF THE INVENTION

Figure 1:
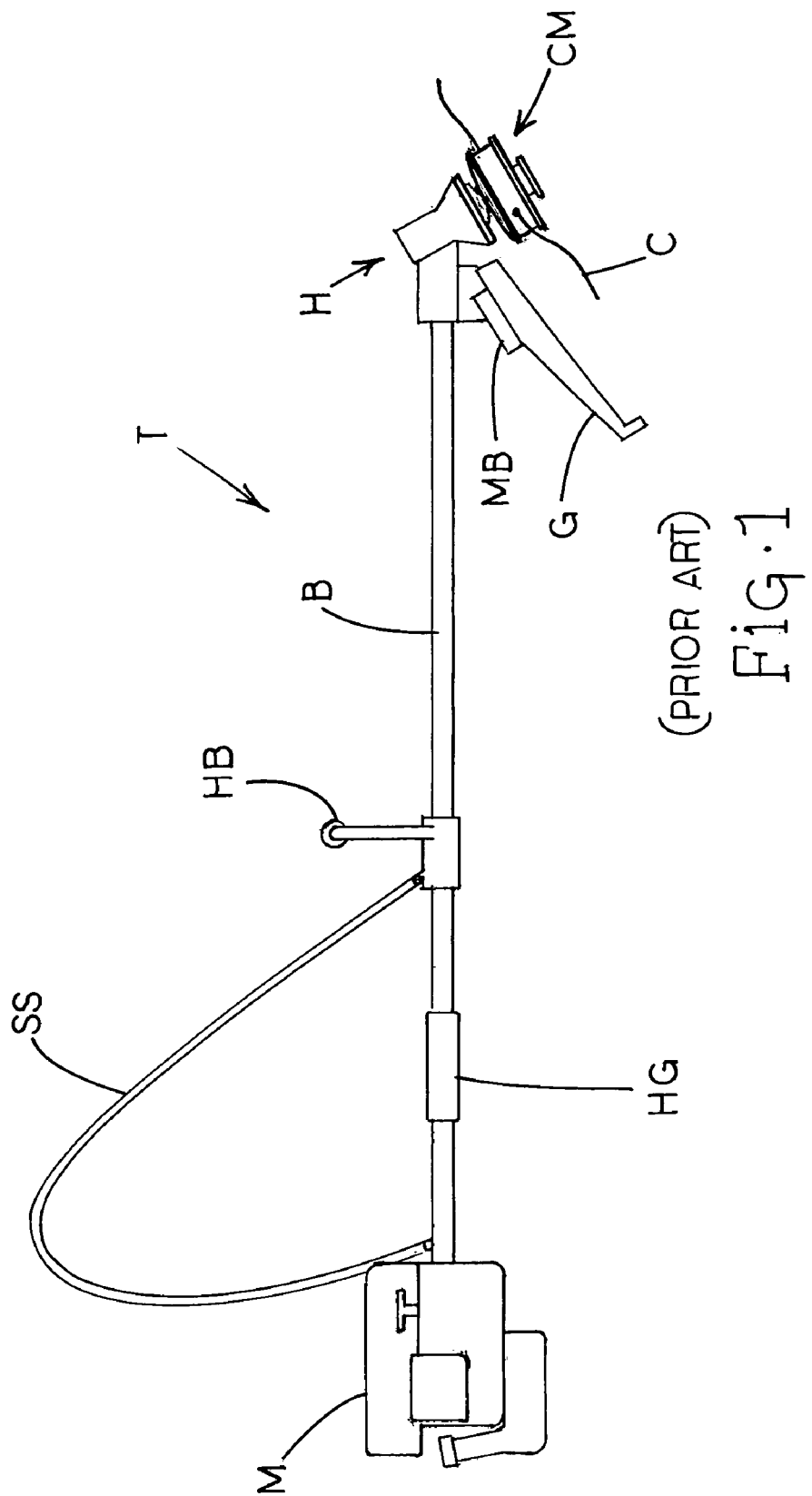
FIG. 1 is a side elevation view of a powered trimmer of known design.
Figure 2:
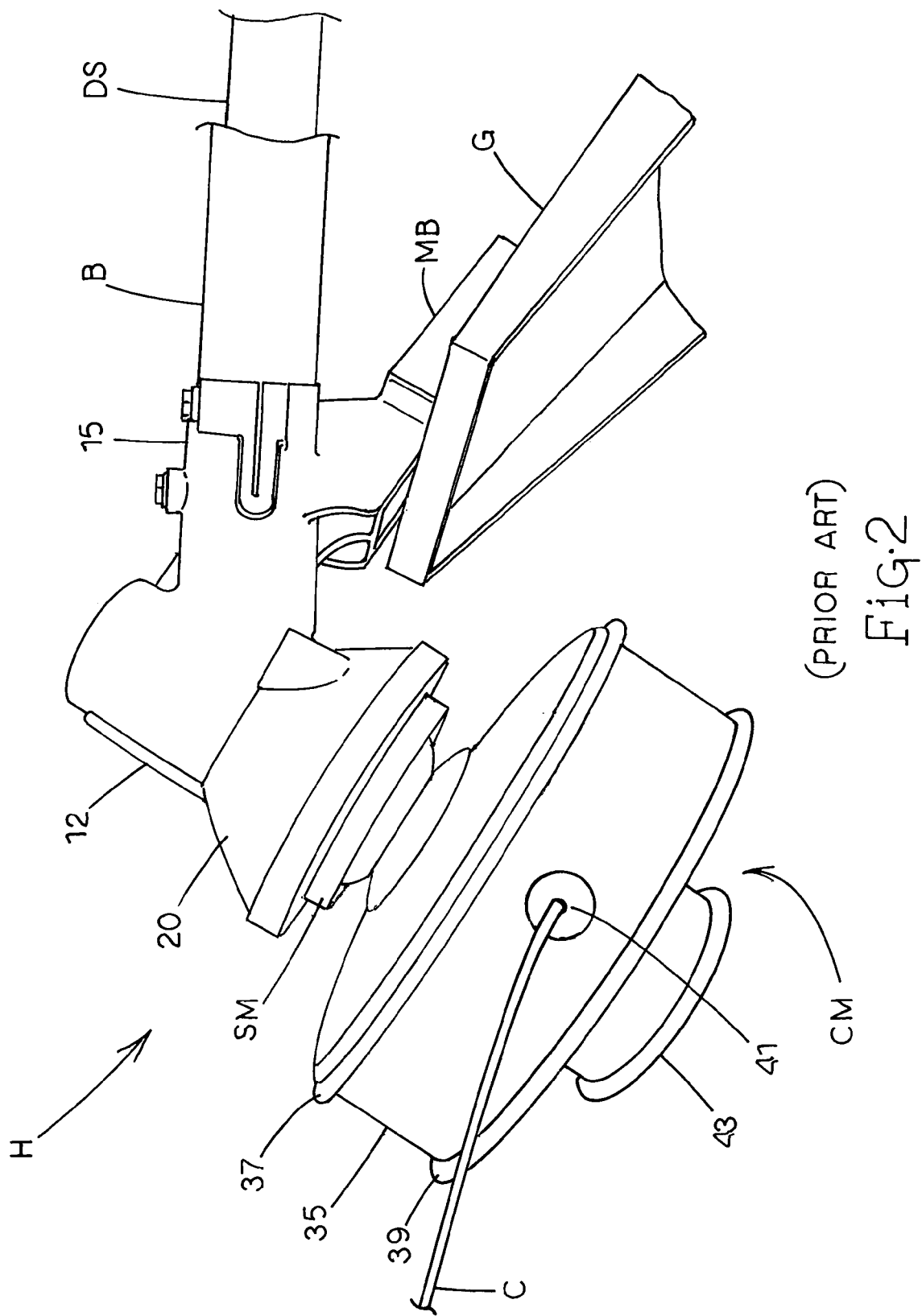
FIG. 2 is a detailed perspective view of a trimmer head assembly provided with the trimmer illustrated in FIG. 1.
Figure 3:
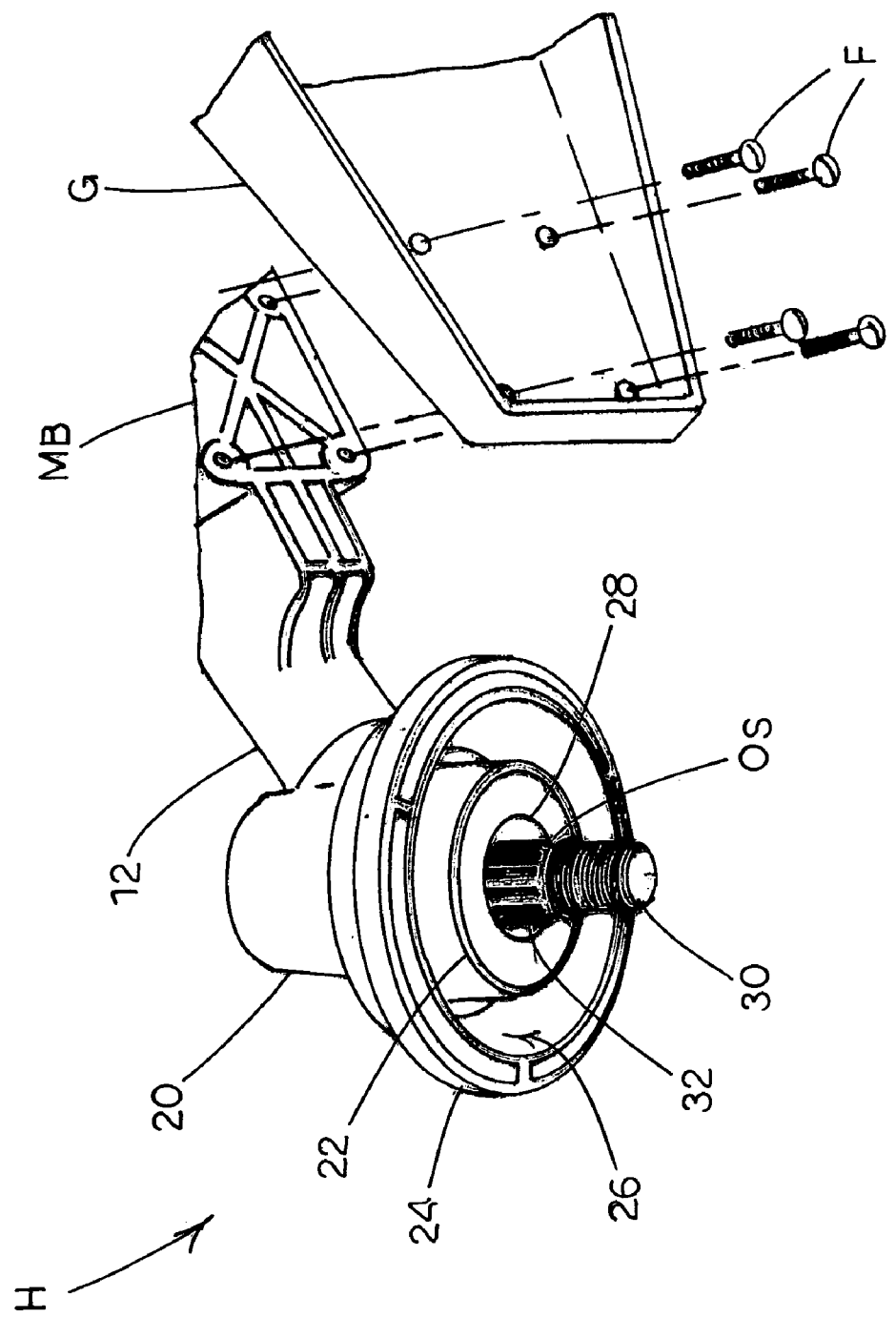
FIG. 3 is a partially cutaway perspective view of a portion of the trimmer head assembly illustrated in FIG. 2.

Referring now to FIGS. 1–3, an example is illustrated of a powered trimmer, generally designated T, of known design. Powered trimmers of the type illustrated in FIGS. 1–3 are used primarily for cutting vegetative matter such as grass, weeds, and brush. Referring specifically to FIG. 1, trimmer T comprises a trimmer gearcase or head assembly, generally designated H; a rotating cutting mechanism, generally designated CM; an elongate section or boom B; and a motor M. Motor M is powered by either internal combustion or electricity. In most current designs, trimmer head assembly H and motor M are mounted at opposite ends of boom B to afford better balance and comfort to an operator of trimmer T. Accordingly, a rotating drive shaft DS (see FIG. 2) or other suitable force-transferring component can be disposed within boom B to couple the output power produced by motor M with trimmer head assembly H for driving cutting mechanism CM. Trimmer T usually includes a hand grip HG and a handle bar HB mounted to boom B for grasping by the operator, and can include a shoulder strap SS to enhance comfort. In addition, a clippings guard G can be mounted to boom B, head assembly H, or an interfacial region between boom B and head assembly H by means of a suitable mounting bracket MB and fasteners F (see FIG. 3) to protect the operator from vegetative matter and other objects thrown outwardly by cutting mechanism CM.

Referring now to FIGS. 2 and 3, additional details of trimmer head assembly H and cutting mechanism CM are illustrated according to the known design. Trimmer head assembly H has a housing 12 comprising a proximal section 15 attached to boom B and a distal section 20. As shown in FIG. 3, distal section 20 includes a main body 22 and an outer shroud 24. An annular space, generally designated 26, is defined within distal section 20 between main body 22 and outer shroud 24. An output shaft OS extends outwardly from a bore 28 formed in main body 22 of distal section 20, and includes a threaded end section 30 that enables cutting mechanism CM to be screwed thereon. Output shaft OS also includes a splined section 32 that matingly receives a spacer member SM for rotation with output shaft OS. Spacer member SM is interposed between distal section 20 and cutting mechanism CM to maintain proper alignment and spacing of cutting mechanism CM in relation to distal section 20. To enable the operator to hold trimmer T at a comfortable angle while maintaining cutting mechanism CM substantially parallel with the ground surface, distal section 20 is disposed at an angle with respect to proximal section 15. Thus, a suitable gear means such as bevel gearing (not shown) is contained within housing 12 to couple drive shaft DS with output shaft OS at the angle.

In the illustrated example, cutting mechanism CM includes a cartridge 35 having proximal and distal annular rims 37 and 39, respectively. As can be appreciated by those of skill in the art, cartridge 35 can contain an internal spool (not shown) about which one or more lengths of polymeric cutting cord, such as nylon cutting cord C, are wound. The end of cord C extends outwardly from radially oriented orifice 41 formed in the side of cartridge 35. Rotation of cartridge 35 about output shaft OS likewise causes rotation of cord C for cutting through vegetative matter. As the length of cord C external to cartridge 35 becomes shorter due to wear and impact, a bumper mechanism 43 can be actuated by the operator to release additional cord C from orifices 41. As an alternative to the use of cartridge 35 with cord C loaded therein, cutting chains or blades could be used.

As depicted in FIG. 2, cutting mechanism CM, spacer member SM, and distal section 20 of trimmer head assembly H are spaced closely together along the axial length of output shaft OS (shown in FIG. 3). In practice, however, gaps exist between these components and hence sections of output shaft OS remain exposed to the ambient environment. That is, in the area of trimmer head assembly H between proximal rim 37 of cutting mechanism CM and bore 28 of distal section 20 of head assembly H, there remains a significant opportunity for debris such as grass clippings or other vegetative matter to enter the spaces between these components and consequently wrap around, become lodged to, or otherwise contact output shaft OS. As will now be described with reference to FIGS. 4A–7B, the present invention provides a shield apparatus, generally designated S, that prevents or at least minimizes the accumulation of vegetative matter on output shaft OS by minimizing exposure of output shaft OS to the ambient environment.

Figure 5:
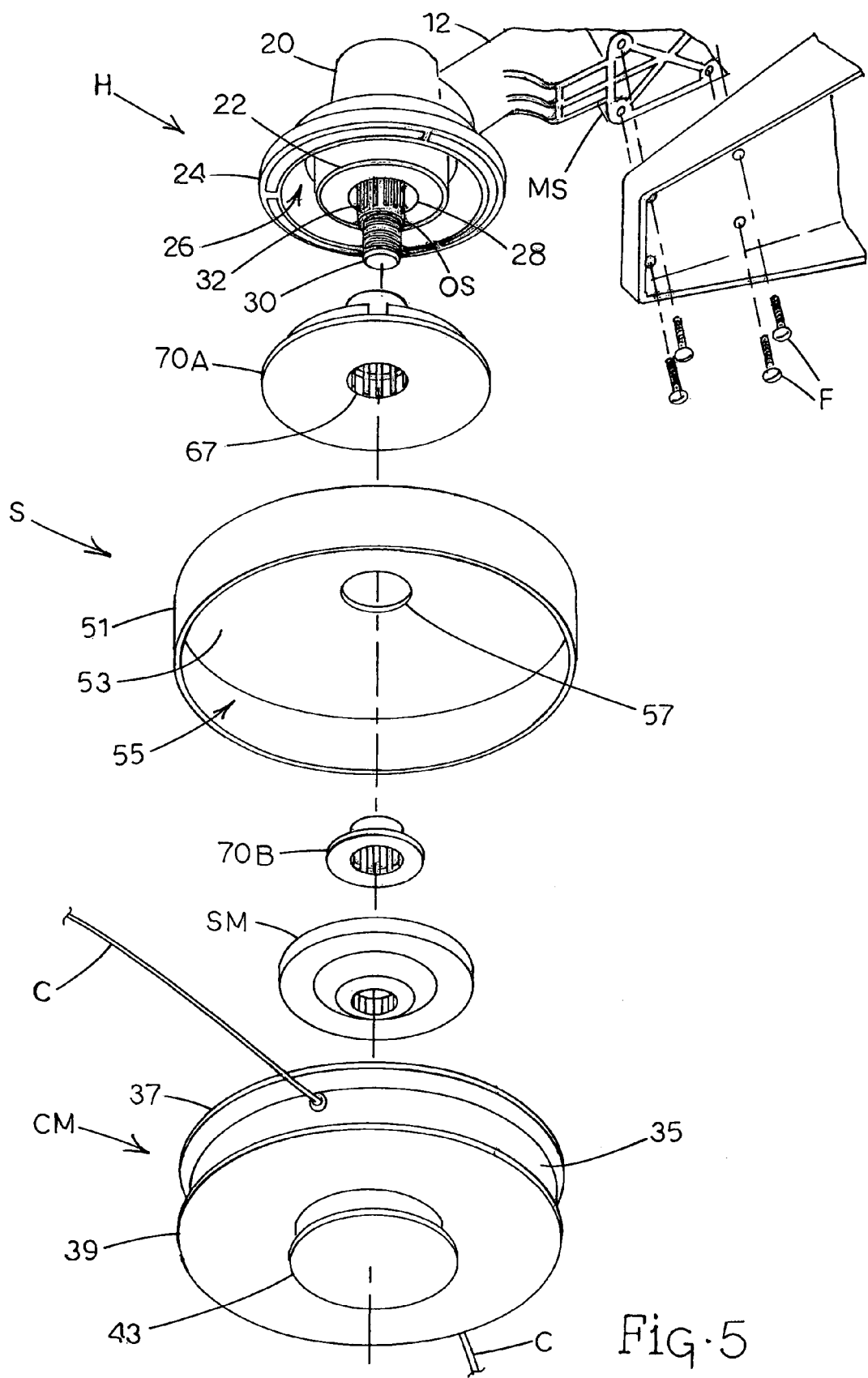
FIG. 5 is an exploded view of a trimmer head assembly provided in accordance with the present invention, illustrating installation of the shield apparatus thereon.

Referring now to FIGS. 4A–4C, shield S comprises a first lateral wall 51 coaxially disposed about an axis A (see FIG. 4C) that coincides with the axis of rotation of output shaft OS (see FIG. 5). Preferably, first lateral wall 51 is cylindrical although it could be of any other suitable shape. A first transverse shield wall 53 is transversely disposed in relation to axis A and adjoins one end of first lateral wall 51. First transverse shield wall 53 and first lateral wall 51 cooperatively define a first interior space, generally designated 55 in FIG. 4C. As shown in the cross-sectional view of FIG. 4C, a first aperture 57 is formed through the central portion of first transverse shield wall 53. First aperture 57 is coaxially centered about axis A to admit output shaft OS therethrough. Shield S also can comprise a second lateral wall 61 extending axially from an outside surface 53A of first transverse shield wall 53 to define a second interior space, generally designated 65 in FIG. 4C. Preferably, second lateral wall 61 is cylindrical although it could be of any other suitable shape. Second lateral wall 61 preferably has radial dimension (e.g., diameter) less than that of first lateral wall 51. Second lateral wall 61 can be directly attached to outside surface 53A of first transverse shield wall 53 or, as shown in FIG. 4C, can alternatively be attached to a second transverse shield wall 63 that is attached to first transverse shield wall 53 by welding or other means. A second aperture 67 can be formed through the center of second transverse shield wall 63 in general alignment with first aperture 57 of first transverse shield wall 53 to accommodate the extension of output shaft OS through first and second apertures 57 and 67.

It thus can be seen that the design of shield S can in one embodiment include two cup-shaped portions of different sizes, with one cup being inverted with respect to the other cup. The first cup is bounded by first transverse shield wall 53 and first lateral wall 51, and encloses first interior space 55. The second cup is bounded by first transverse shield wall 53 (or second transverse shield wall 63 when provided) and second lateral wall 61, and encloses a second interior space, generally designated 65. As described in more detail below, this design enables shield S to be provided as an accessory component for retrofitting to conventional trimmers such as trimmer T illustrated in FIGS. 1–3. Moreover, as will become evident from the description below relating to FIG. 6, the first cup can at least partially enclose cutting mechanism CM, and the second cup can at least partially enclose distal section 20 of trimmer head assembly H.

To facilitate the mounting of shield S to trimmer head assembly H without interfering with existing components, shield S is designed to be mounted coaxially about output shaft OS for rotation therewith, as described hereinbelow and illustrated in FIGS. 5 and 6. This configuration avoids having to mount shield S directly to housing 12 of trimmer head assembly H, which would require the use of fasteners and modification of housing 12 to receive such fasteners.

While shield S could be mounted directly to output shaft OS, the interface between shield S and the output shaft OS can be improved by providing an insert or adapter member, generally designated 70 and shown in FIGS. 4A–4C. Adapter member 70 comprises a hollow cylindrical portion 71 defining a bore through which output shaft OS can extend. The inside surface of cylindrical portion 71 includes features to enable adapter member 70 to be mated with output shaft OS such that rotation of output shaft OS likewise causes rotation of adapter member 70. In the present example, axially oriented splines 71A are formed on the inside surface of cylindrical portion 71 to mate with the grooves of splined section 32 on output shaft OS (see FIG. 5).

Cylindrical portion 71 is inserted through first aperture 57 of first transverse shield wall 53, and through second aperture 67 of second transverse shield wall 63 when provided, so as to mount shield S in non-contacting relation to output shaft OS. To axially retain shield S on adapter member 70, adapter member 70 further comprises first and second annular portions 75 and 77 transversely disposed in relation to axis A on either side of first transverse shield wall 53. In the illustrated example, first annular portion 75 abuts first transverse shield wall 53, and second annular portion 77 abuts second transverse shield wall 63. Adapter member 70 also can comprise a coaxial adapter wall 79 coaxially disposed about cylindrical portion 71 and axially extending from second annular portion 77. The function of coaxial adapter wall 79 is described hereinbelow.

In other embodiments, first annular portion 75 of adapter member 70 can be omitted. In this case, shield S is axially retained on adapter member 70 as a consequence of securely mounting shield S and adapter member 70 on output shaft OS as described hereinbelow with reference to FIG. 5. As an option, to assist in maintaining an aligned, centered relation between adapter member 70 and shield S, adapter member 70 could be provided with one or more bosses or ribs (not shown) that engage with complementary notches or grooves (not shown) formed in shield S. Alternatively, bosses or ribs could be provided on shield S and complementary notches or grooves formed on adapter member 70. In still other embodiments, again in the case where first annular portion 75 is not provided, cylindrical portion 71 of adapter member 70 does not extend through first aperture 57 of first transverse shield wall 53 of shield S, but instead is merely coaxially aligned with first aperture 57.

Shield S and adapter member 70 are preferably constructed from impact-resistant polymeric or metallic materials. By way of example, suitable polymeric materials include polypropylene and glass fiber-reinforced nylon, and suitable metallic materials include readily available alloys such as steels.

Referring now to the exploded view of FIG. 5, the installation of shield S on trimmer head assembly H is illustrated. To facilitate the mounting of adapter member 70 to shield S, adapter member 70 can be initially provided in two adapter parts, which are illustrated as upper adapter part 70A and lower adapter part 70B. Upper and lower adapter parts 70A and 70B are assembled on either side of first transverse shield wall 53, and thereafter affixed together to form adapter member 70 as shown in FIG. 4C by welding or other suitable means. Preferably, adapter member 70 is pre-assembled in this manner so that shield S is commercially distributed to the end user in the form illustrated in FIGS. 4A–4C. Alternatively, as described hereinabove, lower adapter part 70B can be omitted, in which case cylindrical portion 71 is unitary with upper adapter part 70A. Shield S can be coaxially mounted to output shaft OS of trimmer head assembly H by mating adapter member 70 (parts 70A and/or 70B) to splined section 32 of output shaft OS. Spacer member SM can then be mated to splined section 32 in abutment with lower adapter part 70B. Finally, cutting mechanism CM can be screwed onto threaded end section 30 of output shaft OS, axially bearing against spacer member SM such that shield S and adapter member 70 are mounted securely to output shaft OS. It can thus be seen that as output shaft OS rotates to drive cutting mechanism CM, shield S likewise rotates although such rotation is not a necessary condition of the invention.

Figure 6:
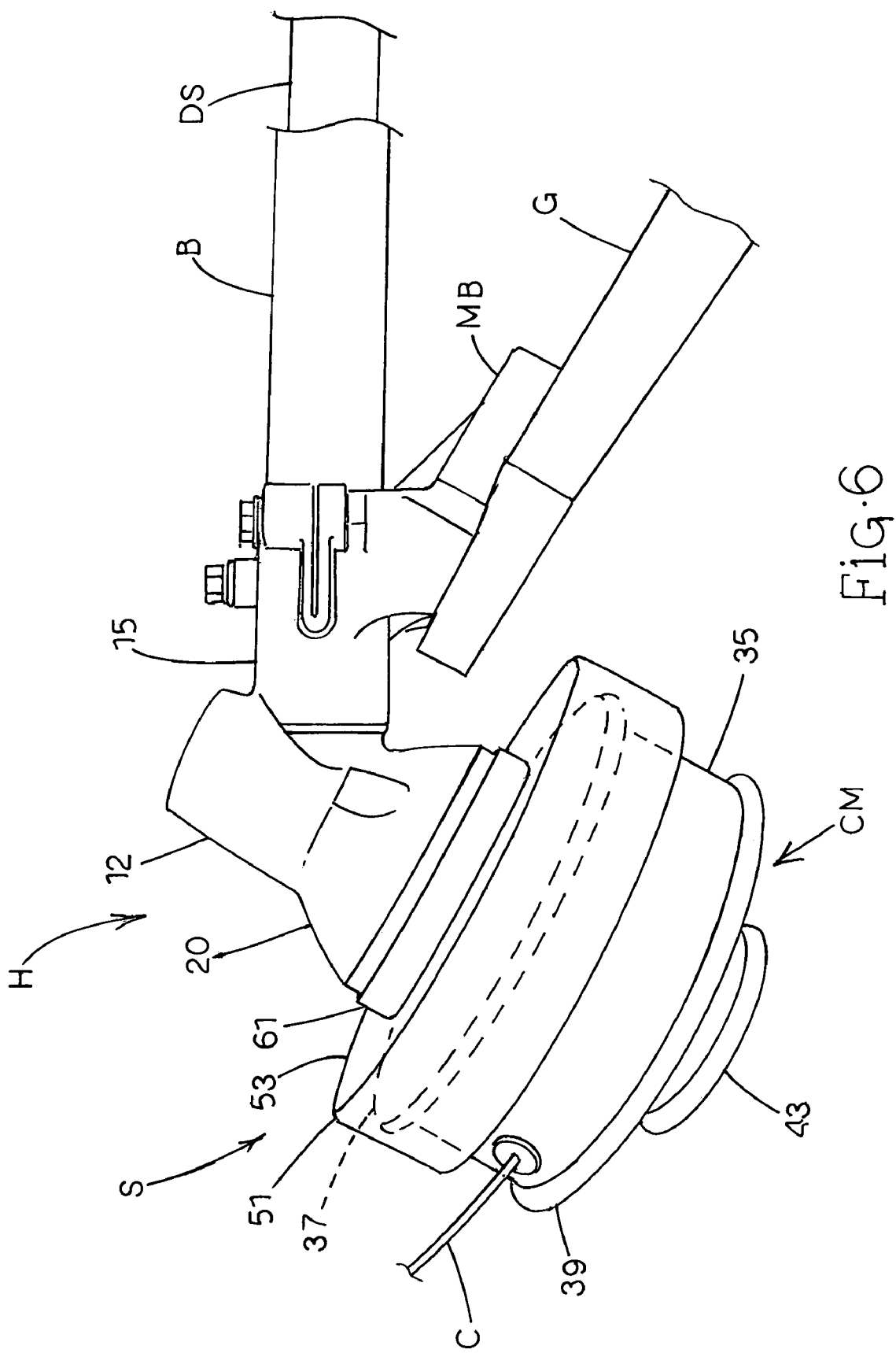
FIG. 6 is a perspective view of the trimmer head assembly of FIG. 5 illustrated in assembled form.
Figure 7A:
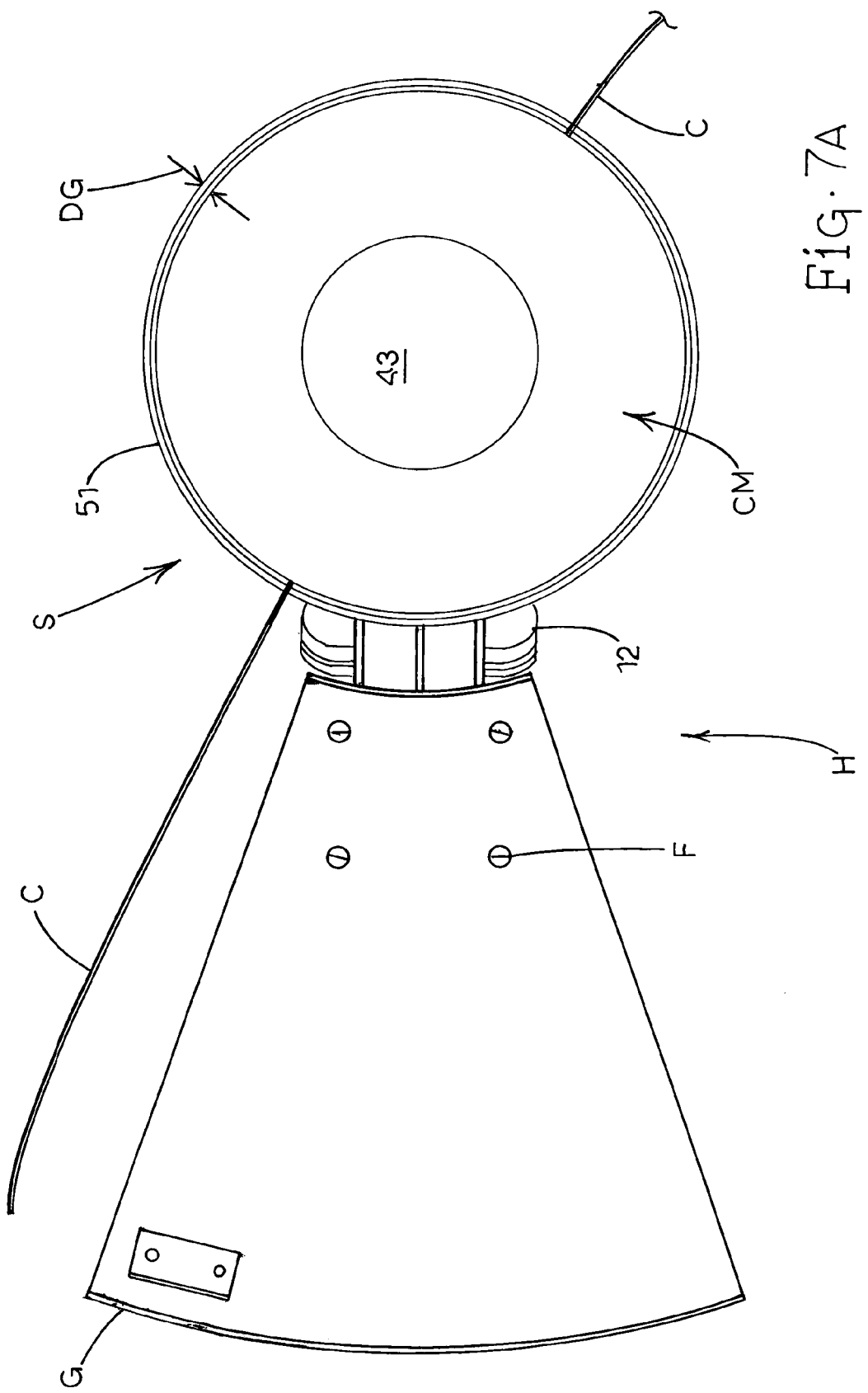
FIG. 7A is a bottom plan view of the trimmer head assembly illustrated in FIGS. 5 and 6.

Referring now to FIG. 6, trimmer head assembly H is illustrated in assembled form with shield S installed in accordance with the invention. First lateral wall 51 of shield S is coaxially disposed about cutting mechanism CM, and is closely adjacent to proximal rim 37 of cutting mechanism CM. It will be noted, however, that first lateral wall 51 is adjacent to only an upper or proximal section of cutting mechanism CM so as not to interfere with the rotation of cords C. The axial position of cutting mechanism CM relative to first lateral wall 51 can vary, as it is only preferable that proximal rim 37 be at least partially covered or overlapped by first lateral wall 51. Second lateral wall 61 of shield S is coaxially disposed about distal section 20 of trimmer head assembly H, at the end of distal section 20 from which output shaft OS (see FIG. 5) extends, and is closely adjacent to this end of distal section 20. As a result, the space surrounding output shaft OS between cutting mechanism CM and trimmer head assembly H is effectively isolated from the ambient environment. This prevents vegetative matter, especially clippings cut and thrown by cutting mechanism CM, from contacting output shaft OS or at least minimizes such contact. As shown in FIG. 7A, only a narrow distal annular gap DG remains between first lateral wall 51 and cutting mechanism CM. As shown in FIG. 7B, only a narrow proximal annular gap PG remains between second lateral wall 61 and distal section 20 of trimmer head assembly H. Additionally, referring back to FIG. 5, it can be seen that coaxial adapter wall 79 of adapter member 70 extends into annular space 26 of distal section 20 between its main body 22 and outer shroud 24, thereby further isolating output shaft OS at bore 28 of distal section 20.

It is envisioned within the scope of the invention that shield S can be installed with trimmer head assemblies and cutting mechanisms of different sizes. Hence, the respective widths of proximal annular gap PG and distal annular gap DG can vary, depending on the size of either cutting mechanism CM or distal section 20 of trimmer head assembly H. Preferably, for the shield S to be effective, the width of either proximal annular gap PG or distal annular gap DG should range from approximately 1 mm to approximately 10 mm. Even more preferably, the width ranges from approximately 1 mm to approximately 2 mm.

It will be understood that trimmer head assembly H, when provided with shield S as shown in FIG. 6, is compatible for use with any conventional powered trimmer such as trimmer T shown in FIG. 1. In addition, shield S does not adversely affect the normal operation of trimmer T. Instead, it will be appreciated from the foregoing description that shield S, by preventing or at least minimizing contact between vegetative matter and output shaft OS, improves the performance of trimmer T and reduces the maintenance and cleaning required for trimmer T.

It will be further understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A shield apparatus in combination with a cutting mechanism of a power vegetation trimmer for preventing or at least minimizing contact between vegetative matter and a rotating output shaft of the vegetation trimmer, the cutting mechanism of a type comprising a cutting element location disposed along a transverse axis for positioning of a cutting element, the shield apparatus comprising:

(a) a first lateral wall coaxially disposed about a central axis and comprising a radial dimension relative to the central axis;

(b) a first transverse shield wall transversely disposed relative to the central axis and adjoining the first lateral wall wherein the first lateral wall extends from the first transverse shield wall in a first direction toward the transverse axis and terminates above the transverse axis of the cutting mechanism, the first transverse shield wall comprising a first aperture coaxially disposed about the central axis to permit extension of the output shaft therethrough, wherein the first lateral wall and the first transverse shield wall define a first interior and at least partially overlaps at least a portion of the cutting mechanism within the first interior above the external cutting element location;

(c) a second lateral wall coaxially disposed about the central axis on an outer side of the first transverse shield wall opposite to the first interior and extending away from the first transverse shield wall in a second direction substantially opposite the first direction, the second lateral wall comprising a second radial dimension relative to the central axis less than the first radial dimension and defining a second interior of the shield at least partially overlapping at least a portion of a head member from which the output shaft can extend;

(d) a second transverse shield wall transversely disposed in relation to the central axis and adjoining the second lateral wall, the second transverse shield wall attached to the outer side of the first transverse shield wall and having a second aperture coaxially disposed about the central axis in general alignment with the first aperture of the first transverse shield wall; and (e) an adapter member for mounting to the output shaft of a vegetation trimmer for rotation therewith and for mounting the shield apparatus in non-contacting relation to the output shaft, the adapter member comprising a hollow cylindrical portion extending through the first and second apertures, a first annular adapter plate coaxially disposed around the hollow cylindrical portion and disposed in the first interior adjacent to the first transverse shield wall, and a second annular adapter plate coaxially disposed around the hollow cylindrical portion and disposed in the second interior adjacent to the second transverse shield wall.

2. A shield apparatus in combination with a cutting mechanism of a power vegetation trimmer for preventing or at least minimizing contact between vegetative matter and a rotating output shaft of the vegetation trimmer, the cutting mechanism of a type comprising a cutting element location disposed along a transverse axis for positioning of a cutting element, the shield apparatus comprising:

(a) a first lateral wall coaxially disposed about a central axis and comprising a radial dimension relative to the central axis;

(b) a first transverse shield wall transversely disposed relative to the central axis and adjoining the first lateral wall wherein the first lateral wall extends from the first transverse shield wall in a first direction toward the transverse axis and terminates above the transverse axis of the cutting mechanism, the first transverse shield wall comprising a first aperture coaxially disposed about the central axis to permit extension of the output shaft therethrough, wherein the first lateral wall and the first transverse shield wall define a first interior and at least partially overlaps at least a portion of the cutting mechanism within the first interior above the external cutting element location;

(c) a second lateral wall coaxially disposed about the central axis on an outer side of the first transverse shield wall opposite to the first interior and extending away from the first transverse shield wall in a second direction substantially opposite the first direction, the second lateral wall comprising a second radial dimension relative to the central axis less than the first radial dimension and defining a second interior of the shield at least partially overlapping at least a portion of a head member from which the output shaft can extend;

(d) a hollow cylindrical portion disposed in the second interior in alignment with the first aperture for attachment to the output shaft of a vegetation trimmer and for mounting the shield apparatus coaxially about the output shaft; and (e) a coaxial adapter wall coaxially disposed around the cylindrical portion.

3. A shield apparatus in combination with a cutting mechanism of a power vegetation trimmer for preventing or at least minimizing contact between vegetative matter and a rotating output shaft of the vegetation trimmer, the cutting mechanism of a type comprising a cutting element location disposed along a transverse axis for positioning of a cutting element, the shield apparatus comprising:

(a) a first lateral wall coaxially disposed about a central axis and comprising a radial dimension relative to the central axis;

(b) a first transverse shield wall transversely disposed relative to the central axis and adjoining the first lateral wall wherein the first lateral wall extends from the first transverse shield wall in a first direction toward the transverse axis and terminates above the transverse axis of the cutting mechanism, the first transverse shield wall comprising a first aperture coaxially disposed about the central axis to permit extension of the output shaft therethrough, wherein the first lateral wall and the first transverse shield wall define a first interior and at least partially overlaps at least a portion of the cutting mechanism within the first interior above the external cutting element location;

(c) a second lateral wall coaxially disposed about the central axis on an outer side of the first transverse shield wall opposite to the first interior and extending away from the first transverse shield wall in a second direction substantially opposite the first direction, the second lateral wall comprising a second radial dimension relative to the central axis less than the first radial dimension and defining a second interior of the shield at least partially overlapping at least a portion of a head member from which the output shaft can extend; and (d) an adapter member for mounting to the output shaft of a vegetation trimmer for rotation therewith and for mounting the shield apparatus in non-contacting relation to the output shaft, the adapter member comprising a hollow cylindrical portion extending through the first aperture, a first annular adapter plate coaxially disposed around the cylindrical portion and disposed in the first interior, and a second annular adapter plate coaxially disposed around the cylindrical portion and disposed in the second interior.

* * * * *